United States Patent
Yamazaki (10) Patent No.: US 10,189,361 B2
(45) Date of Patent: Jan. 29, 2019

(54) CHARGING AND DISCHARGING CURRENT QUANTITY DISPLAY DEVICE FOR ELECTRIC VEHICLE

(71) Applicant: MITSUBISHI JIDOSHA KOGYO KABUSHIKI KAISHA, Tokyo (JP)

(72) Inventor: Yasuyuki Yamazaki, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/463,256

(22) Filed: Mar. 20, 2017

(65) Prior Publication Data

US 2017/0197516 A1 Jul. 13, 2017

Related U.S. Application Data

(63) Continuation of application No. PCT/JP2015/082060, filed on Nov. 16, 2015.

(30) Foreign Application Priority Data

Dec. 4, 2014 (JP) ................. 2014-245521

(51) Int. Cl.
- *H02J 7/00* (2006.01)
- *H02J 7/02* (2016.01)
- *B60L 11/18* (2006.01)

(52) U.S. Cl.
CPC ....... *B60L 11/1818* (2013.01); *B60L 11/1861* (2013.01); *H02J 7/0047* (2013.01);
(Continued)

(58) Field of Classification Search
None
See application file for complete search history.

(56) References Cited

U.S. PATENT DOCUMENTS

2004/0207532 A1* 10/2004 Smithson ................. G08B 5/38
340/643
2011/0043355 A1 2/2011 Chander et al.
(Continued)

FOREIGN PATENT DOCUMENTS

CN 102458904 A 5/2012
JP 2008-252986 A 10/2008
(Continued)

OTHER PUBLICATIONS

Chinese Office Action and Search Report, dated Sep. 3, 2018, for Chinese Application No. 201580050977.7, with an English translation of the Office Action.

*Primary Examiner* — David V Henze-Gongola
(74) *Attorney, Agent, or Firm* — Birch, Stewart, Kolasch & Birch, LLP (57) ABSTRACT

An electric vehicle (1) provided with a power-feed unit (14) having charging ports (141 and 142) and a battery (11) which is charged by means of electric power supplied from an external power supply, by way of the power-feed unit (14), is provided with: a current sensor (15) which detects a charging current quantity or a discharging current quantity flowing to or from the battery (11); a current quantity display unit (143) which comprises a plurality of display bodies (143a to 143d) arranged on the power-feed unit (14), and which displays the magnitude of a current quantity (i) by varying the lighting state of each indicator (143a to 143d); and a current quantity display control unit (16) which controls the lighting state of each of the display bodies (143a to 143d) in accordance with the current quantity detected by the current sensor (15).

6 Claims, 6 Drawing Sheets

(52) U.S. Cl.
CPC ............ *H02J 7/0068* (2013.01); *H02J 7/027*
(2013.01); *B60L 2240/549* (2013.01); *B60L 2250/16* (2013.01); *H02J 7/02* (2013.01); *Y02T 10/7005* (2013.01); *Y02T 90/14* (2013.01)

(56) References Cited

U.S. PATENT DOCUMENTS

| | | | |
|---|---|---|---|
| 2012/0043935 A1* | 2/2012 | Dyer | B60L 1/003 320/109 |
| 2012/0143425 A1* | 6/2012 | Yamamoto | B60K 6/365 701/22 |
| 2013/0077328 A1* | 3/2013 | Hook | B60L 11/1818 362/459 |
| 2013/0326955 A1 | 12/2013 | Kotama et al. | |

FOREIGN PATENT DOCUMENTS

| | | |
|---|---|---|
| JP | 2009-77550 A | 4/2009 |
| JP | 2014-96927 A | 5/2014 |
| WO | WO 2012/049733 A1 | 4/2012 |
| WO | WO 2013/180324 A1 | 12/2013 |

\* cited by examiner

CHARGING AND DISCHARGING CURRENT QUANTITY DISPLAY DEVICE FOR ELECTRIC VEHICLE

CROSS REFERENCE TO RELATED APPLICATIONS

This application is a Continuation of PCT International Application No. PCT/JP2015/082060, filed on Nov. 16, 2015, which claims priority under 35 U.S.C. 119(a) to Patent Application No. 2014-245521, filed in the Japan on Dec. 4, 2014, all of which are hereby expressly incorporated by reference into the present application.

TECHNICAL FIELD

The present invention relates to a charging and discharging current quantity display device for an electric vehicle, which displays a charging and discharging current quantity of a battery mounted on an electric vehicle and charged by electric power supplied from an external power supply.

BACKGROUND ART

Conventionally, when a gasoline engine vehicle is fueled with gasoline, which is an energy source, the user, holding a fueling lever, can feel sound and vibration caused by gasoline flowing and know fueling is ongoing, and can recognize also from rotation of an indicator and sound from a pump that fueling is ongoing. Since the power of the vehicle is off during fueling, the amount of gasoline supplied is not indicated by an indicator on the vehicle. However, the user can recognize by the fuel pump stopping supplying gasoline that the gasoline tank has got filled up.

On the other hand, for electric vehicles, such as EV/PHEV vehicles, when the battery is charged, which is an energy source, charging starts when a charging connector provided to a power supply outside the vehicle (hereinafter referred to as an external power supply) is set into a charging port provided on the electric vehicle. If there is any display on the charging supply side, or if there are segments for charging or the like on an indicator on the vehicle, the user can recognize that charging is ongoing. Then, with a lamp indicating power-feeding on the charging supply side turning off, or an indication by the segments of an indicator on the instrument panel, the user can recognize that the battery has been fully charged.

Meanwhile, conventionally, in order to supply AC power for household use utilizing the equipment (such as a battery) on a vehicle when a power outage occurs, or in case of emergency, or the like, there is a power supply system that includes a power supply apparatus (invertor) which is connected to a battery of a vehicle when a power outage occurs. The power supply system converts DC power, inputted from the battery into the power supply apparatus, into AC power, and supplies the AC power as household use. Among those power supply systems, one with a power supply apparatus (invertor) provided with a display unit that indicates values of current [A] and power [W] has been disclosed (for example, see Patent Document 1 below).

In addition, among high-speed charging apparatuses that rapidly charge a battery adapted to high-speed charging, some high-speed charging apparatuses have a display and setting unit that receives and displays a value of current at every moment during charging (for example, see Patent Document 2 below).

PRIOR ART DOCUMENT

Patent Document

Patent Document 1: Japanese Patent Application Publication No. 2014-96927
Patent Document 2: Japanese Patent Application Publication No. 2009-77550

SUMMARY OF THE INVENTION

Problems to be Solved by the Invention

However, in a conventional electric vehicle, there has been a problem that it is inconvenient that the user cannot recognize the charging amount when the user is near the charging port because a display unit indicating whether charging is ongoing is provided at a location away from the charging port, such as on the instrument panel. In addition, when the user is near the charging port, the user cannot know how much electric power is being supplied during charging. For this reason, there has been a problem that the user cannot know whether current is really flowing, for example, in the case that charging does not finish after a sufficient length of time has passed.

In view of the above situation, an object of the present invention is to provide a charging and discharging current quantity display device for an electric vehicle with which it is possible for a current quantity during charging or discharging of a battery to be easily ascertained in the vicinity of a power-feed unit.

Means for Solving the Problems

A charging and discharging current quantity display device for an electric vehicle according to a first aspect of the present invention to solve the problem above is
a charging and discharging current quantity display device for an electric vehicle, comprising:
 a power-feed unit having a charging port; and
 a electricity storage unit which is charged by electric power supplied from an external power supply through the charging port;
 wherein the charging and discharging current quantity display device for an electric vehicle comprises:
 a current quantity detection unit that detects a charging and discharging current quantity of the electricity storage unit;
 a current quantity display unit that includes a plurality of indicators arranged at the power-feed unit and indicates the magnitude of the charging and discharging current quantity of the electricity storage unit by changing lighting states of the indicators; and
 a current quantity display controlling unit that controls a lighting state of each of the indicators in accordance with the current quantity detected by the current quantity detection unit.

A charging and discharging current quantity display device for an electric vehicle according to a second aspect of the present invention is the charging and discharging current quantity display device for an electric vehicle according to the first aspect of the present invention, wherein
 the indicators are arranged around the charging port.

A charging and discharging current quantity display device for an electric vehicle according to a third aspect of the present invention is the charging and discharging current quantity display device for an electric vehicle according to the first aspect of the present invention, wherein the current quantity display controlling unit changes the number of indicators to turn on in accordance with the current quantity detected by the current quantity detection unit.

A charging and discharging current quantity display device for an electric vehicle according to a fourth aspect of the present invention is the charging and discharging current quantity display device for an electric vehicle according to the second aspect of the present invention, wherein the current quantity display controlling unit changes the number of indicators to turn on in accordance with the current quantity detected by the current quantity detection unit.

A charging and discharging current quantity display device for an electric vehicle according to a fifth aspect of the present invention is the charging and discharging current quantity display device for an electric vehicle according to the second aspect of the present invention, wherein the current quantity display controlling unit controls the lighting states of the indicators such that each of the indicators blinks sequentially in one direction and changes a speed at which each of the indicators blinks sequentially in the one direction, in accordance with the current quantity detected by the current quantity detection unit.

A charging and discharging current quantity display device for an electric vehicle according to a sixth aspect of the present invention is the charging and discharging current quantity display device for an electric vehicle according to the first aspects of the present invention, wherein the power-feed unit has two charging ports, and the indicators are arranged to surround the two charging ports.

A charging and discharging current quantity display device for an electric vehicle according to a seventh aspect of the present invention is the charging and discharging current quantity display device for an electric vehicle according to the second aspects of the present invention, wherein the power-feed unit has two charging ports, and the indicators are arranged to surround the two charging ports.

A charging and discharging current quantity display device for an electric vehicle according to a eighth aspect of the present invention is the charging and discharging current quantity display device for an electric vehicle according to the third aspects of the present invention, wherein the power-feed unit has two charging ports, and the indicators are arranged to surround the two charging ports.

A charging and discharging current quantity display device for an electric vehicle according to a ninth aspect of the present invention is the charging and discharging current quantity display device for an electric vehicle according to the fourth aspects of the present invention, wherein the power-feed unit has two charging ports, and the indicators are arranged to surround the two charging ports.

A charging and discharging current quantity display device for an electric vehicle according to a tenth aspect of the present invention is the charging and discharging current quantity display device for an electric vehicle according to the fifth aspects of the present invention, wherein the power-feed unit has two charging ports, and the indicators are arranged to surround the two charging ports.

Effect of the Invention

The charging and discharging current quantity display device for an electric vehicle according to the present invention allows the user to visually recognize approximately how much current is flowing when charging or discharging electricity storage unit, and improves the convenience.

BRIEF DESCRIPTION OF THE DRAWINGS

FIGS. 6($a$)-6($d$) are an explanatory diagram illustrating indication examples of a current quantity display unit according to the first embodiment of the present invention. FIG. 6($a$) is an indication example for the case where current quantity i is 0 or more and less than $i_1$; FIG. 6($b$), $i_1$ or more and less than $i_2$; FIG. 6($c$), $i_2$ or more and less than $i_3$; and FIG. 6($d$), $i_3$ or more.

FIG. 8($a$) is a front view illustrating another example of the charging and discharging current quantity display device for an electric vehicle according to the second embodiment of the present invention, and FIG. 8($b$) is a front view of still another example of the charging and discharging current quantity display device for an electric vehicle according to the second embodiment of the present invention.

MODE FOR CARRYING OUT THE INVENTION

Hereinafter, referring to the attached drawings, descriptions are provided for details of a charging and discharging current quantity display device for an electric vehicle according to the present invention. Note that the present invention is not limited to the following embodiments, and various modifications are possible without departing from the gist of the present invention.

First Embodiment

Figure 1:
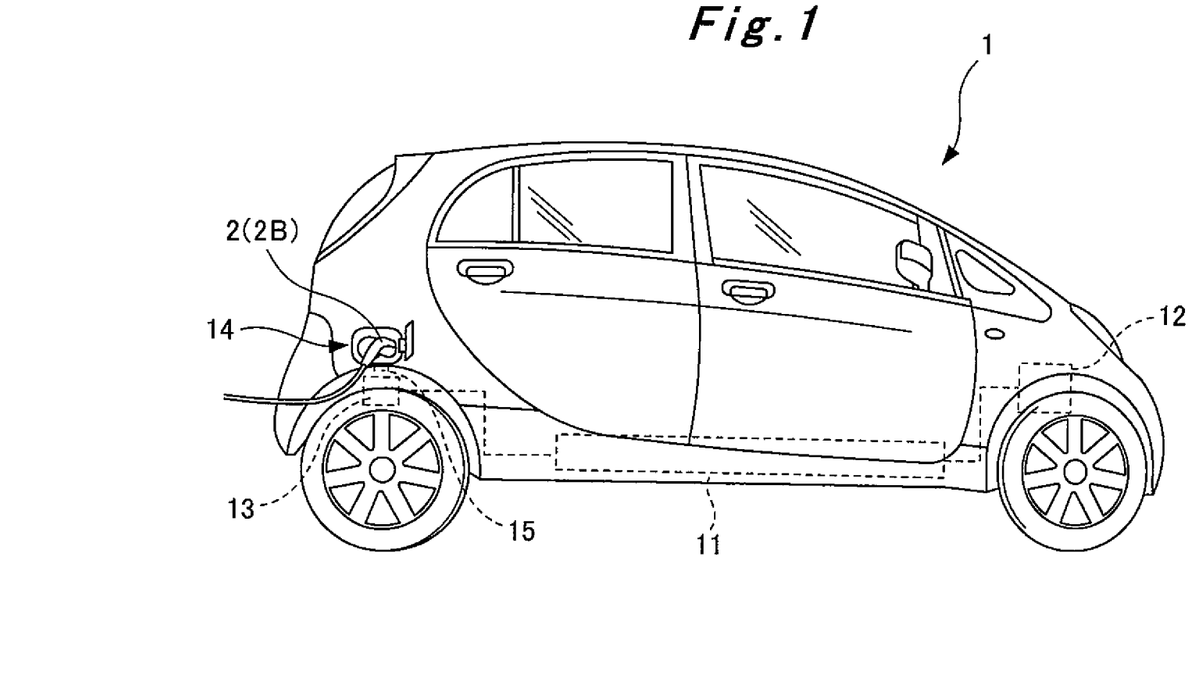
FIG. 1 is a side view schematically illustrating an example of a vehicle to which a charging and discharging current quantity display device for an electric vehicle according to the present invention is applied.

Using FIGS. 1 to 6, descriptions are provided for a charging and discharging current quantity display device for an electric vehicle according to a first embodiment of the present invention. As illustrated in FIG. 1, in this embodiment, an electric vehicle 1 travels by driving an electric motor 12 mounted in the electric vehicle 1, using electric power stored in a battery (electricity storage unit) 11. Supplied power is supplied from an external power supply through a charging connector 2 connected to a power-feed unit 14, and stored in the battery 11 via a charging device 13.

Figure 2:
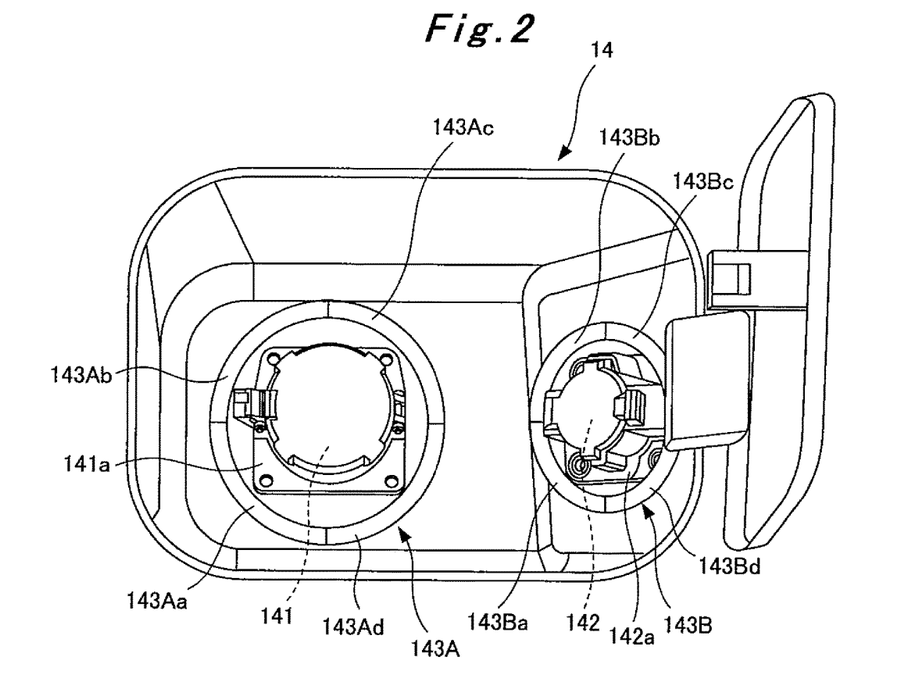
FIG. 2 is a front view illustrating a charging and discharging current quantity display device for an electric vehicle according to a first embodiment of the present invention.

As illustrated in FIG. 2, in this embodiment, the power-feed unit 14 is provided with a regular charging port 141 and a rapid charging port 142. In addition, the power-feed unit 14 is also provided with a current quantity display unit 143A for regular charging and a current quantity display unit 143B for rapid charging. Hereinafter, when generically referring to the current quantity display unit 143A for regular charging and the current quantity display unit 143B for rapid charging, they are referred to as "current quantity display units 143".

The regular charging port 141 is provided with a regular charging socket 141a, to which a regular charging connector 2A (see FIG. 4) is attachably and detachably connected, the regular charging connector 2A being provided at an end of a low-voltage power cable extended from the external power supply (charging installation). In addition, the rapid charging port 142 is provided with a rapid charging socket 142a, to which a rapid charging connector 2B (see FIG. 1) is attachably and detachably connected, the rapid charging connector 2B being provided at an end of a high-voltage power cable extended from the external power supply (charging installation).

The current quantity display unit 143A for regular charging and the current quantity display unit 143B for rapid charging indicate a charging current quantity i of the battery 11 flowing from the regular charging port 141 or the rapid charging port 142 to the battery 11 by turning on or off the light during charging, and indicate a discharging current quantity i of the battery 11 flowing from the battery 11 to the regular charging port 141 or the rapid charging port 142 by turning on or off the light during discharging. Each of them is formed, for example, in an annular shape and surrounds the regular charging port 141 or the rapid charging port 142.

Specifically, each of the current quantity display unit 143A for regular charging and the current quantity display unit 143B for rapid charging includes four current quantity display areas (indicators) arranged along the circumferential direction, in other words, arranged on the same circumference. Hereinafter, as viewed from the front of the current quantity display units 143A and 143B, current quantity display areas at the lower left are called current quantity display areas 143Aa and 143Ba (generically called "first current quantity display areas 143a"), current quantity display areas at the upper left are called current quantity display areas 143Ab and 143Bb (generically called "second current quantity display areas 143b"), current quantity display areas at the upper right are called current quantity display areas 143Ac and 143Bc (generically called "third current quantity display areas 143c"), and current quantity display areas at the lower right are called current quantity display areas 143Ad and 143Bd (generically called "fourth current quantity display areas 143d").

Figure 3:
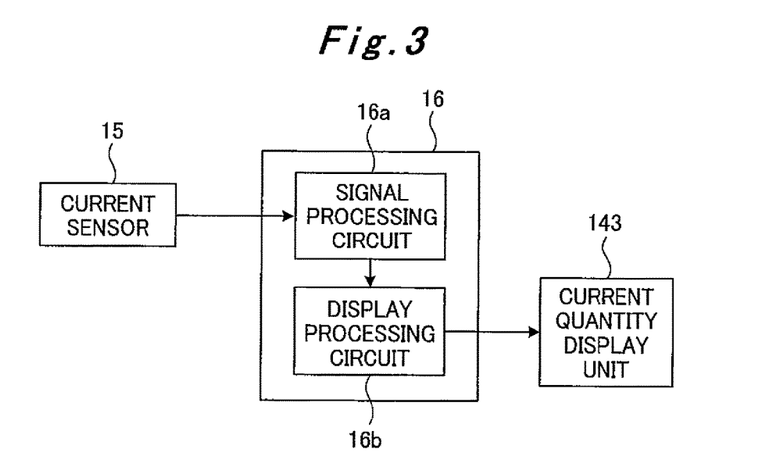
FIG. 3 is a block diagram illustrating a configuration of a current quantity display controlling unit of the charging and discharging current quantity display device for an electric vehicle according to the first embodiment of the present invention.

Here, a not-illustrated cable that connects between the battery 11 and each of the regular charging port 141 and the rapid charging port 142 is provided with a current sensor (current quantity detection unit) 15 (see FIG. 1) that detects current quantity i flowing through the cable. As illustrated in FIG. 3, the current quantity i detected by the current sensor 15 is converted to a signal and inputted into a current quantity display controlling unit 16. The current quantity display controlling unit 16 includes a signal processing circuit 16a and a display processing circuit 16b. The signal processing circuit 16a processes a signal inputted from the current sensor 15, and the display processing circuit 16b determines whether to turn on or off each of the first to fourth current quantity display areas 143a to 143d based on the current quantity i detected by the current sensor 15 and sends control signals to the current quantity display units 143. In this way, turning on and off the first to fourth current quantity display areas 143a to 143d is controlled in accordance with the current quantity i detected by the current sensor 15.

Figure 4:
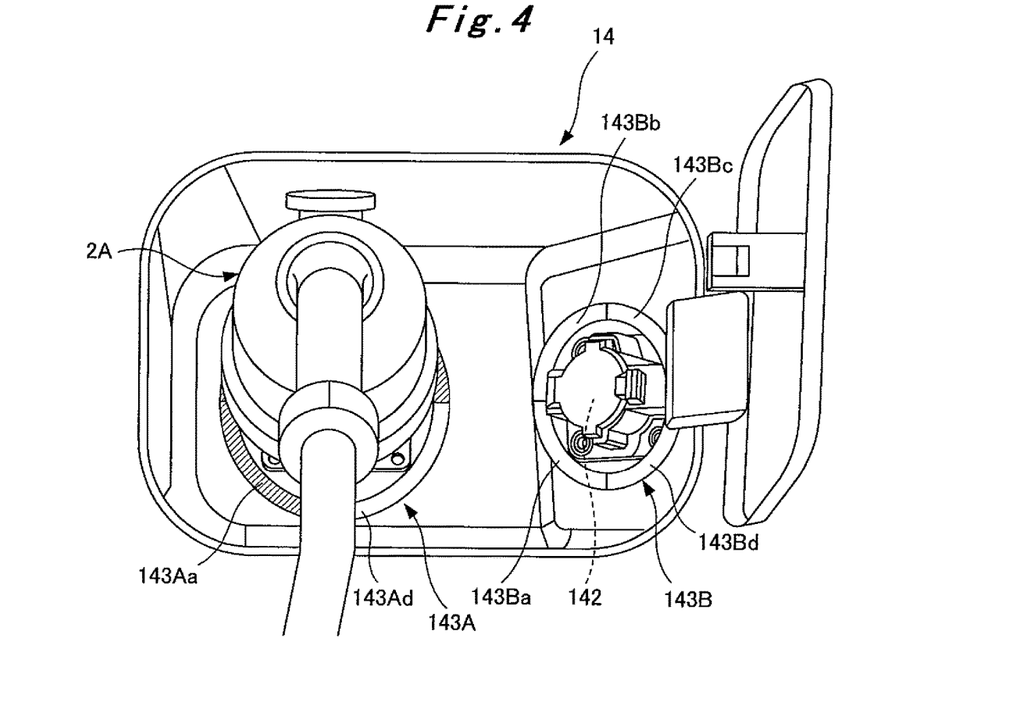
FIG. 4 is an explanatory diagram illustrating the charging and discharging current quantity display device for an electric vehicle according to the first embodiment of the present invention with a charging connector connected to a regular charging port.

Note that in this embodiment, as illustrated in FIG. 4, for example, when the battery 11 is charged with a home use charging connector 2A connected to the regular charging socket 141a, the current quantity display unit 143A for regular charging displays an indication in accordance with the magnitude of the current quantity i based on the control signal inputted from the current quantity display controlling unit 16. When the battery 11 is charged with a rapid charging connector 2B, which is provided at an end of the high-voltage cable, connected to the rapid charging socket 142a, the current quantity display unit 143B for rapid charging displays an indication in accordance with the magnitude of the current quantity i based on the control signal inputted from the current quantity display controlling unit 16.

Hereinafter, using FIGS. 5 and 6, descriptions are provided for indication examples for the current quantity i according to this embodiment. Note that in FIG. 6, lighting areas are represented by hatching, and light-out areas are represented by outlines. The same applies to FIGS. 7 to 9 to be described later.

Figure 5:
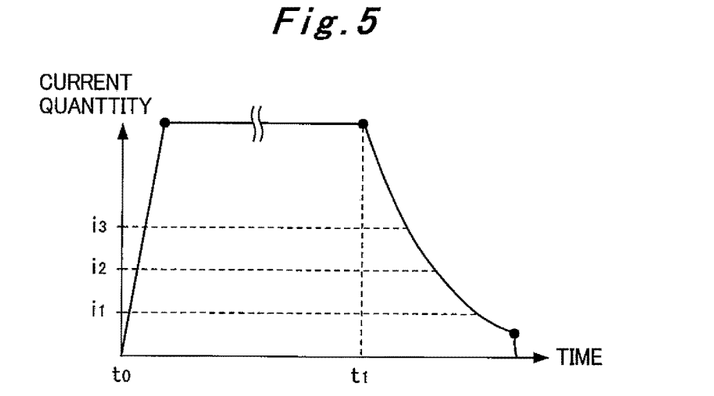
FIG. 5 is a graph illustrating a change of electrical current during charging.

As illustrated in FIG. 5, when the battery 11 is charged, constant current charging is performed until the charged amount reaches a specified value (for example, about 80%, assuming full charge is 100%) (from $t=t_0$ to $t=t_1$ in FIG. 5). On the other hand, constant voltage charge is performed when the charged amount is more than or equal to a specified value (after $t=t_1$ in FIG. 5), and the current quantity i decreases as the charged amount increases.

Figure 6A:
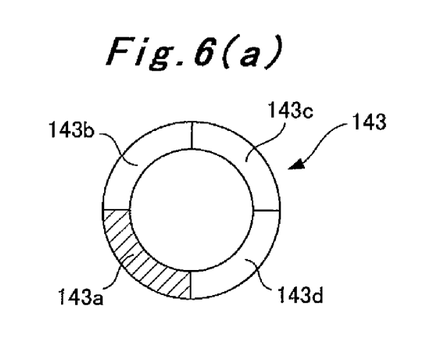
Figure 6B:
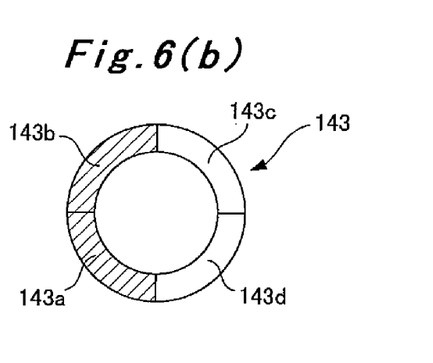
Figure 6C:
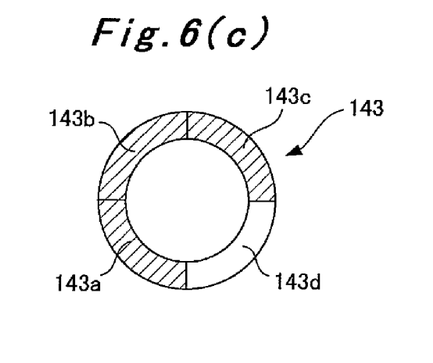
Figure 6D:
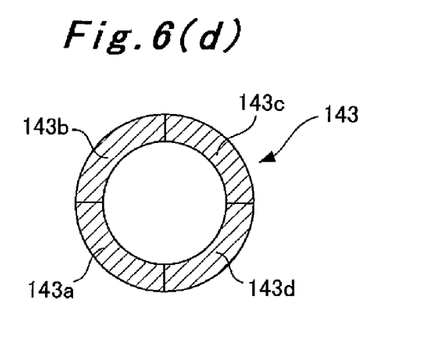

In this embodiment, when the current quantity i is $0<i<i_1$, the first current quantity display area 143a is turned on while the second to fourth current quantity display areas 143b to 143d are turned off as illustrated in FIG. 6(a). When the current quantity i is $i_1 \leq i < i_2$, the first and second current quantity display areas 143a and 143b are turned on while the third and fourth current quantity display areas 143c and 143d are turned off as illustrated in FIG. 6(b). When the current quantity i is $i_2 \leq i < i_3$, the first to third current quantity display areas 143a to 143c are turned on while the fourth current quantity display area 143d is turned off as illustrated in FIG. 6(c). When the current quantity i is $i_3 \leq i$, all the first to fourth current quantity display areas 143a to 143d are turned on as illustrated in FIG. 6(d). Note that although not illustrated, when the current quantity i is i=0, all the first to fourth current quantity display areas 143a to 143d are turned off.

Here, the current quantities $i_1$ to $i_3$ may be set as appropriate in accordance with the condition. For example, if the maximum value of the current quantity i is 16 A, for example, $i_1$, $i_2$, and $i_3$ may be 4, 8, and 12 A, respectively.

The charging and discharging current quantity display device for an electric vehicle according to this embodiment, which is configured as described above, allows the user to visually recognize approximately how much current is flowing when charging or discharging the battery 11.

In addition, the user can recognize the charging status sensuously. For example, when a current quantity display unit 143 displays an indication illustrated in FIG. 6(a) some time after charging starts, the user can recognize that charging is reaching the end.

Note that although an example is shown in the embodiment described above in which the current quantity display unit 143 is provided in the annular shape to surround the charging port, the present invention is not limited to the embodiment described above. The current quantity display unit 143 may be formed in an ellipse shape or a star shape and surround the charging port, for example. Or alternatively, the first to fourth current quantity display areas 143a to 143d may be linearly arranged, for example.

Second Embodiment

Figure 7:
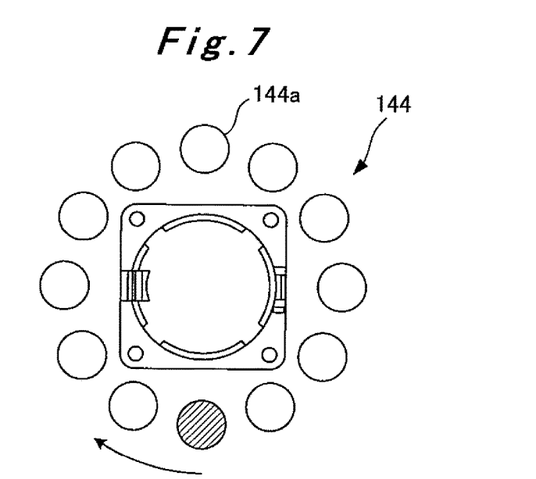
FIG. 7 is a front view illustrating a charging and discharging current quantity display device for an electric vehicle according to a second embodiment of the present invention.
Figure 8A:
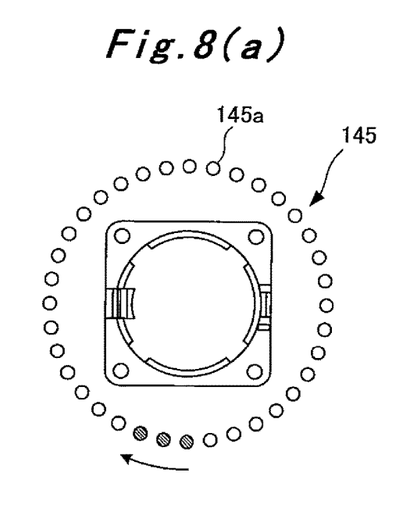
Figure 8B:
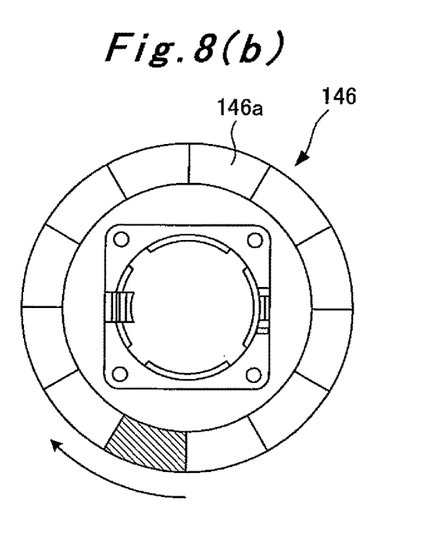

Using FIGS. 7 and 8, descriptions are provided for a charging and discharging current quantity display device for an electric vehicle according to a second embodiment of the present invention.

The charging and discharging current quantity display device for an electric vehicle according to this embodiment employs a current quantity display unit 144 illustrated in FIG. 7 instead of the current quantity display unit 143 in the first embodiment. Other configuration is the same as that in the first embodiment described above. Hence, hereinafter repetitive descriptions are omitted, and descriptions are provided denoting the same parts by the same reference signs.

The current quantity display unit 144, designed to indicate the current quantity i flowing through the regular charging port 141 and the rapid charging port 142 by blinking or turning off, includes twelve circular current quantity indicators 144a arranged on the same circumference with the same intervals, surrounding the regular charging port 141 and the rapid charging port 142.

In this embodiment, when the battery 11 is charged with the home use charging connector 2 connected to the regular charging socket 141a, or when the battery 11 is charged with the rapid charging connector, which is provided at an end of the non-illustrated high-voltage cable, to the rapid charging socket 142a, the current quantity display unit 144 provided at each of the regular charging port 141 and the rapid charging port 142 displays an indication according to the magnitude of the current quantity i based on the information inputted from the current quantity display controlling unit 16 by turning on and off (blinking) each current quantity indicator 144a sequentially in the circumferential direction (one direction).

To be specific, for example, in the case where the current quantity i is small according to the information inputted from the current quantity display controlling unit 16, an interval from the timing of turning on a current indicator 144a to the timing of turning on the next current indicator 144a is increased, compared to the case where the current quantity i is large. In other words, control is performed such that when the current quantity i is small, each current quantity indicator 144a turns on and off (blinks) sequentially in a circumferential direction at a slow rotational speed, and when the current quantity i is large, each current quantity indicator 144a turns on and off (blinks) sequentially in the circumferential direction at a fast rotational speed.

The charging and discharging current quantity display device for an electric vehicle according to this embodiment, which is configured as described above, allows the user to visually recognize the charging and discharging current quantity i of the battery 11 as in the first embodiment described above.

Note that the present invention is not limited to the embodiment described above. For example, as illustrated in FIGS. 8 (a) and 8 (b), the current quantity display unit may be a current quantity display unit 145 including dot-shaped current quantity indicators 145a arranged on the same circumference with the same intervals, or may be a current quantity display unit 146 including face-shaped current quantity indicators 146a arranged on the same circumference in a circular shape. In addition, the shape of the current quantity indicators is not limited to a circular shape, but may be another shape as long as they can surround each of the regular charging port 141 and the rapid charging port 142.

Third Embodiment

Hereinafter, descriptions are provided for a charging and discharging current quantity display device for an electric vehicle according to a third embodiment of the present invention.

The charging and discharging current quantity display device for an electric vehicle according to this embodiment is based on the charging and discharging current quantity display device for an electric vehicle of the second embodiment illustrated in FIGS. 7 and 8, and is configured such that the current quantity indicators (144a, 145a, or 146a) are sequentially turned on and off in different directions (courses) when the battery 11 is charged and when the battery 11 is discharged.

In other words, for example, when the battery 11 is charged, the current quantity indicators (144a, 145a, or 146a) turn on and off (blink) sequentially clockwise, and when the battery 11 is discharged, the current quantity indicators (144a, 145a, or 146a) turn on and off sequentially counterclockwise.

Other configuration is the same as that in the second embodiment described above, and repetitive descriptions are omitted.

The charging and discharging current quantity display device for an electric vehicle according to this embodiment, which is configured as described above, allows the user to visually recognize which of charging and discharging is ongoing, in addition to the effects of the second embodiment.

Fourth Embodiment

Hereinafter, using FIG. 9, descriptions are provided for a charging and discharging current quantity display device for an electric vehicle according to a fourth embodiment of the present invention.

Figure 9:
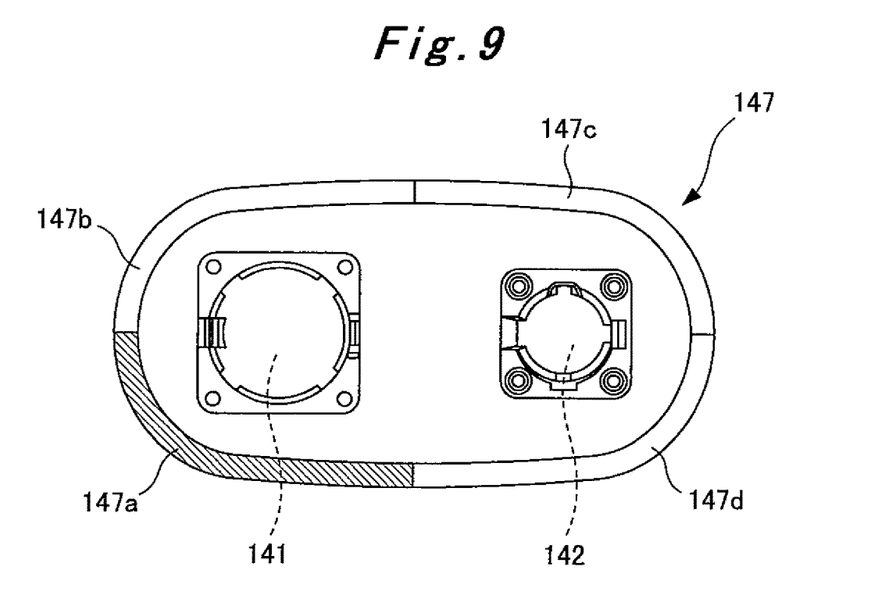
FIG. 9 is a front view illustrating a charging and discharging current quantity display device for an electric vehicle according to a fourth embodiment of the present invention.

As illustrated in FIG. 9, the charging and discharging current quantity display device for an electric vehicle according to this embodiment is an example in which a current quantity display unit 147 is provided so as to surround both the regular charging port 141 and the rapid charging port 142. The structure of the current quantity display unit 147 is the same as that of the current quantity display unit 143, 144, 145, or 146 described in the first to third embodiments above (FIG. 9 illustrates an example to which the same structure as that of the current quantity display unit 143 described in the first embodiment is applied), and here detailed descriptions are omitted.

The charging and discharging current quantity display device for an electric vehicle according to this embodiment, which is configured as described above, provides the same operations and effects as in the first to third embodiment.

INDUSTRIAL APPLICABILITY

The present invention is applicable and preferable to a charging and discharging current quantity display device for an electric vehicle.

REFERENCE SIGNS LIST 1 electric vehicle
2 charging connector
2A regular charging connector
2B rapid charging connector 11 battery
12 electric motor
13 charging device
14 power-feed unit
15 current sensor
16 current quantity display controlling unit
16a signal processing circuit
16b display processing circuit
141 regular charging port
142 rapid charging port
143, 144, 145, 146, 147 current quantity display unit
143a to 143d first to fourth current quantity display areas
143A current quantity display unit for regular charging
143Aa to 143Ad first to fourth current quantity display areas
143B current quantity display unit for rapid charging
143Ba to 143Bd first to fourth current quantity display areas
145a, 146a current quantity indicator
147a to 147d first to fourth current quantity display areas

The invention claimed is:

1. A charging and discharging current quantity display device for an electric vehicle, comprising:
   a power-feed unit having a charging port; and
   an electricity storage unit which is charged by electric power supplied from an external power supply through the charging port;
   a current sensor detecting a charging and discharging current quantity of the electricity storage unit;
   a current quantity display unit that includes a plurality of indicators arranged at the power-feed unit and indicates the magnitude of the charging and discharging current quantity of the electricity storage unit by changing lighting states of the indicators; and
   a current quantity display controller controlling a lighting state of each of the indicators in accordance with the current quantity detected by the current sensor,
   wherein the indicators are arranged around the charging port, and
   wherein the current quantity display controller controls the lighting states of the indicators such that each of the indicators blinks sequentially in one direction and changes the direction in which each of the indicators blinks sequentially, between when the battery is being charged and when the battery is being discharged.

2. The charging and discharging current quantity display device for an electric vehicle according to claim 1, wherein
   the current quantity display controller changes the number of indicators to turn on in accordance with the current quantity detected by the current sensor.

3. The charging and discharging current quantity display device for an electric vehicle according to claim 1, wherein
   the current quantity display controller controls the lighting states of the indicators such that each of the indicators blinks sequentially in one direction and changes a speed at which each of the indicators blinks sequentially in the one direction, in accordance with the current quantity detected by the current sensor.

4. The charging and discharging current quantity display device for an electric vehicle according to claim 1, wherein the power-Iced unit has two charging ports, and the indicators are arranged to surround the two charging ports.

5. The charging and discharging current quantity display device for an electric vehicle according to claim 2, wherein the power-feed unit has two charging ports, and the indicators are arranged to surround the two charging ports.

6. The charging and discharging current quantity display device for an electric vehicle according to claim 3, wherein the power-feed unit has two charging ports, and the indicators are arranged to surround the two charging ports.

* * * * *